Jan. 30, 1962 H. C. FISCHER 3,019,278

THERMOELECTRIC GENERATOR AND METHOD OF MAKING SAME

Filed Dec. 30, 1959 2 Sheets-Sheet 1

INVENTOR.
H. C. FISCHER
BY
Henry Brunner
ATTORNEY

INVENTOR.
H. C. FISCHER
BY
[signature]
ATTORNEY

United States Patent Office 3,019,278
Patented Jan. 30, 1962

3,019,278
THERMOELECTRIC GENERATOR AND METHOD OF MAKING SAME

Harry C. Fischer, Montville, N.J., assignor to Thermo-Craft Corp., Montville, N.J., a corporation of New Jersey Filed Dec. 30, 1959, Ser. No. 863,011
9 Claims. (Cl. 136—4)

This invention relates to thermoelectric generators and procedures for fabricating and forming the same, adaptable to an infinite variety of uses in electric and electronic circuits and equipment.

An object of the invention is to make such a device which is highly practical, rugged, durable and essentially trouble-free in use.

The above and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters indicate like parts:

Figures 1, 2, 3, 4, 5:
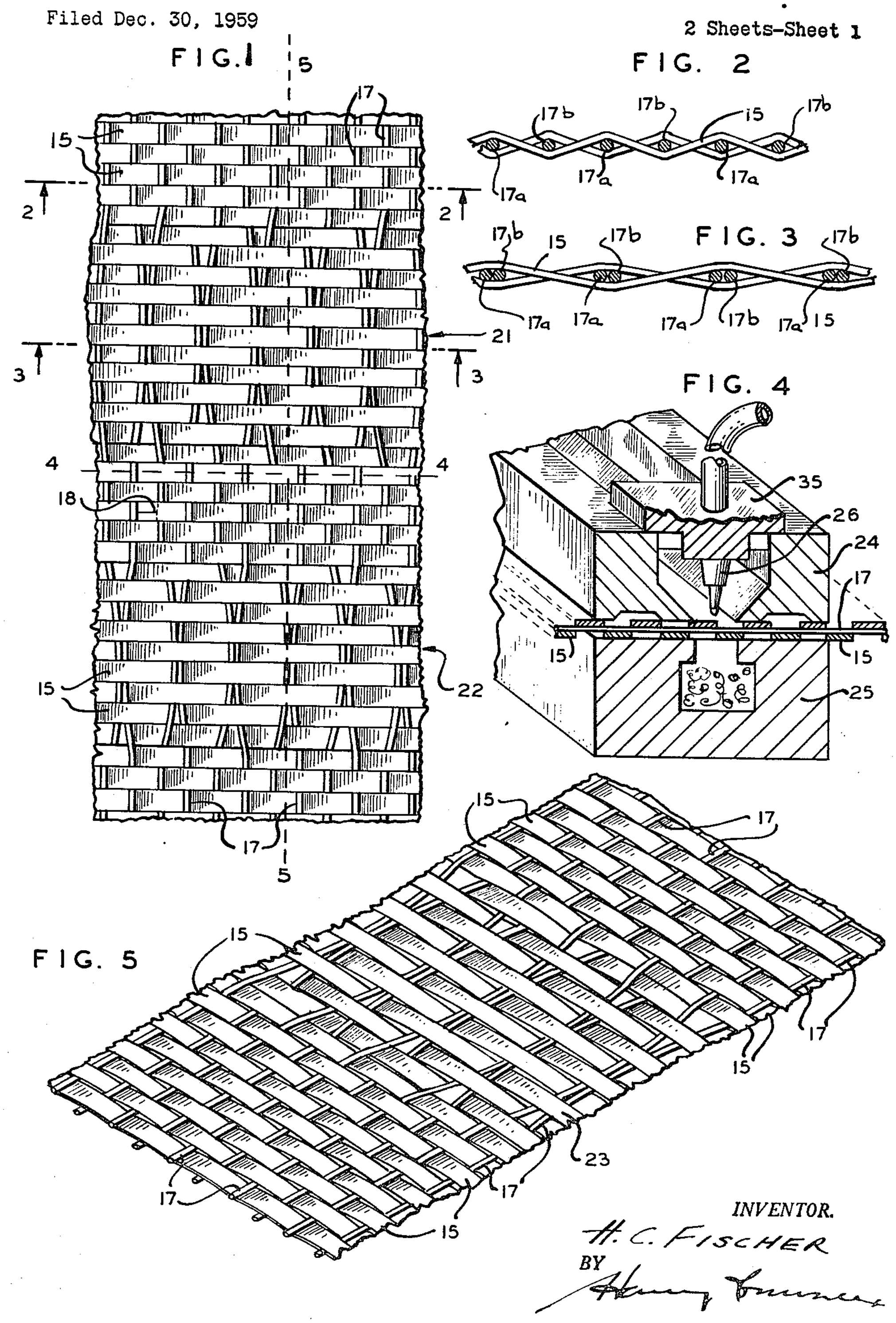
FIGURE 1 is a fragmentary plan view of a plurality of conductive wires having a group of flexible dielectric strips threaded therethrough pursuant to the invention, for forming a thermoelectric generator.
FIGURE 2 is a vertical sectional view thereof, taken at line 2—2 of FIGURE 1.
FIGURE 3 is a vertical sectional view thereof, taken at line 3—3 of FIGURE 1.
FIGURE 4 is a perspective, partly sectional view of an apparatus useful in forming the thermoelectric generator of the invention, including a torch movable along the line 3—3 of FIGURE 1.
FIGURE 5 is a fragmentary perspective view of the structure shown in FIGURE 1.
Figure 6:
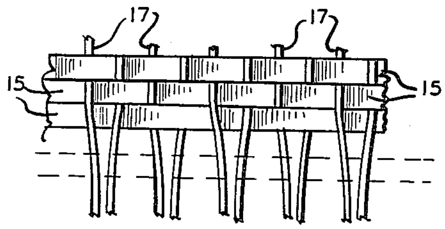
FIGURE 6 is a fragmentary plan view of an end portion thereof, just prior to the finishing step.
Figure 7:
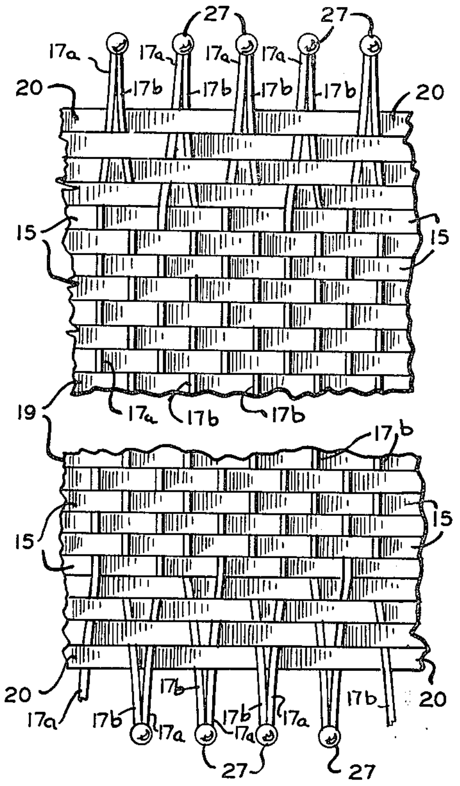
FIGURE 7 is a fragmentary plan view, illustrating alternate pairs of extending ends of wires moved together and forming junctions in the thermoelectric generator of the invention.

Pursuant to the invention, conductive wires, generally designated by the reference character 17 (FIG. 1), alternate wires being of different thermoelectric properties or values, as indicated by the different reference characters **17*a*, 17*b*, in FIGURES 2, 3 and 7, are disposed side by side in generally spaced relation and interwoven with flexible strips 15** of insulating material, in the manner of making cloth.

In practicing the invention, a single flexible thread, strip or band 15 may be woven as a woof progressively back and forth across the width of an array of wires disposed side by side as a warp, over one wire and under the next by suitable weaving means to define, in effect, lengths of flexible strips 15 disposed side by side and approximately contiguously.

The invention utilizes an arrangement of wires of alternating different thermoelectric properties, as indicated at **17*a*, 17*b*, in FIGURE 7, from which it will be noted (reading from left to right) that at the lower end of the figure the pairing of wires is 17*b* to 17*a*, while at the top of the figure the pairing is 17*a* to 17*b*. That is, the pairs at one end are reversed in order of thermoelectric properties, as compared with those at the other end. The wires, when connected as shown herein and above described, define a series-connected thermocouple in a sort of deep sawtoothed relation. The different thermoelectric properties of the wires may, for example, be attained by using "Copel" and "Chromel" as the materials for forming the wires 17*a*, 17*b***, respectively. Another example is "Alumel" and "Chromel" and those skilled in the art will know of other materials which may be paired for the purpose.

As shown in the drawings, a plurality of conductive wires **17*a*, 17*b*, are disposed in side by side relation in a given plane through the axes of said wires along the line 5—5 of FIGURE 1 and flexible dielectric strips 15 are threaded progressively back and forth through the wires along the same plane but at an angle thereto, as parallel to the line 4—4 of FIGURE 1. In the woven product the flexible strips 15 define a group 19 (FIGURE 7) the end or outermost strips being designated as 20 and the group 19 being composed of a number of strips woven over and under the wires 17*a* and 17*b* (FIGURE 2). The wires are moved together (FIGURE 3) to define contacting or almost contacting wire pairs, as shown, for example, at "21" and "22" in FIGURE 1, as contrasted with the spacing 18** (FIGURE 1) of said wires in the remainder of the length of the generator, and there cut and electrically connected (FIGURES 4 and 8) to separate the assembly into individually complete thermoelectric generators.

To that end, the strips 15 may initially be woven over and under single wire lengths spaced apart as at 18 (FIGURE 1) and then over and under pairs of wires which will thus be moved together at said appropriate points 21, 22 where they are cut and junctions 27 effected between adjacent wires. Where fiberglass strips 15 are used they will tend to contract and draw the pairs of wires together at points 21, 22, as shown in FIGURE 3.

By weaving an array of the strips 15 back and forth across an array of single wires for the width of the wire array and then progressively back and forth across pairs of wires, in the manner shown in FIGURE 1 (as by use of suitable weaving apparatus) the paired ends of the wires thus assembled are ready for the cutting and junction-forming step, which may be effected using the apparatus shown in FIGURE 4 to form the junctions 27 of the thermoelectric generator of FIGURE 7, wherein the paired ends of the wires at one end of the generator are of reversed thermoelectric values or properties as compared to those at the other end thereof.

Figure 8:
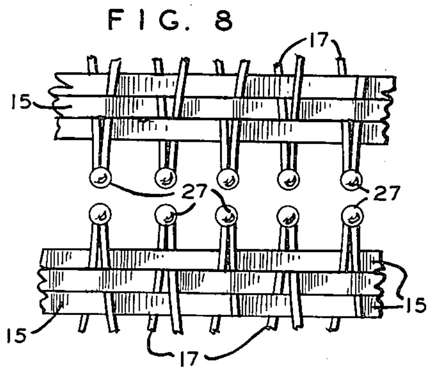
FIGURE 8 is a fragmentary plan view of ends of thermocouple generators of the invention.

Junctions 27 may be achieved by mechanical cutting, bonding and sealing means, or, as shown in FIGURE 4, the cutting and sealing steps may be achieved in a single operation. This may be effected with the woven assembly of the groups of strips 19 and the wires 17 so positioned between the jaws 24, 25 of the illustrated clamp and running a torch 26, carried by block 35 across the woven product as at 21, 22 (FIGURE 1) slidably along a line parallel to line 4—4, cutting away part or all of one or more of the strips 15 and simultaneously forming the junction 27, as by welding, at the paired ends of the conductive wires 17 (FIGURE 8). As will be appreciated from viewing FIGURES 1 and 7, the thermoelectric generator thus formed has fused and welded junction ends 27 (FIGURE 8) of pairs of conductive wires 17 extending from one longitudinal end thereof and fused or welded junction ends of alternate pairs of conductive wires at the opposite longitudinal end of the assembly.

The assembly formed as shown in FIGURE 7 may be of a width considerably greater than that shown in the drawings, and may be folded along lines parallel to the line 5—5 of FIGURE 1, the folds separated from one another by sheets 37 of mica or other suitable insulating material, positioned within a casing such as 28 (FIGURES 9 and 10) with a heat insulation plate or sheet 29 mounted thereon if desired, and said casing being marginally closed, for example, as shown at 30. As the drawings show only a typical fragment, with the parts enlarged, it will be understood that in a commercial embodiment more thermocouples are provided in series. In desirable embodiments, I have used as few as twelve and as many as twenty passes of the fiberglass strips through arrays of conductive wires in order to pull the pairs close together (as at 20, FIG. 7). Electrical leads or terminals 31 and 32 (FIGURE 10) may be connected respectively to fused junction ends 27 at a face 35 of the assembly opposite the "hot" end 33 thereof, or preferably to the ends of single wires at the end of the assembly to make full use of all the junctions. As an example, the lower end of the single wire 17 at the left of FIGURE 7 (or the equivalent in the folded embodiment), may be connected to the lead 32, and the lower end of the single wire **17*b* at the right of said figure (or the equivalent in the folded embodiment) may be connected to the lead 31**.

Figures 9, 10, 11:
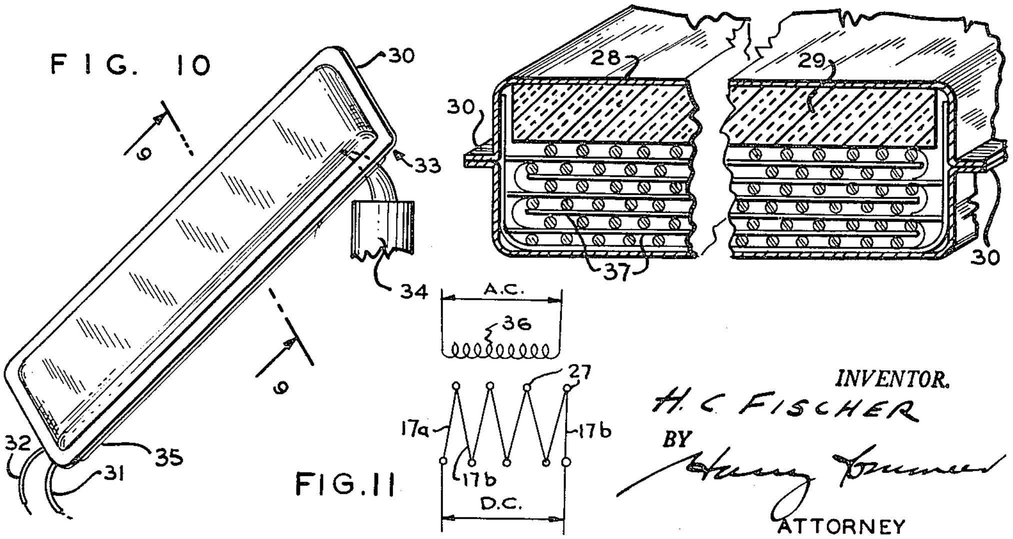
FIGURE 9 is an enlarged transverse sectional view taken at the line 9—9 of FIGURE 10.
FIGURE 10 is a perspective view of a thermoelectric device embodying the invention, showing, schematically, a heat source for actuating same.
FIGURE 11 is a diagram showing how heat may be electrically supplied to a generator embodying the invention.

The thermoelectric generator device thus formed, for example, as shown in FIGURE 10, may have its ends maintained at different temperatures, as by having heat applied from a source 34 to the "hot" end 33 thereof (the other, or cold end 35 is shown in FIGURE 10 as closer to the viewer) thus generating an electric potential at the leads 31, 32, respectively connected to the wires **17*a* and 17*b* at the opposite margins of the array. As an alternative, the heat source 34 may be replaced, as illustrated in FIGURE 11, by electrical heating means, as in the form of a resistor coil 35** traversed by alternating current from a commercial source, forming, in effect, an electrical converter for producing an isolated source of pure or non-pulsating direct current, suitable as a biasing means. Also, as another alternative, the assembly of FIGURE 7 may be rolled to cylindrical or other form instead of being folded, with the turns insulated from one another by sheet mica or other suitable insulating material.

The dielectric strips 15 may be formed of any material suitable for the above-described purposes, such as fiberglass, and the conductive wires **17*a* and 17*b*, may be formed of any two suitable conducting metals or alloys and may be uncoated as shown in the drawings or covered with a dielectric covering of a material which may be readily cut or burned away. The relative dimensions shown on the drawings are intended for facility of illustration only; the cross section or diameter of the wires 17 may, for example, in practice, be much less relative to the cross section of the flexible strips 15** than indicated in the drawings.

Having now described the invention in detail in accordance with the requirements of the Patent Statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A thermoelectric generator comprising a group of conductive wires disposed side by side in spaced relation as a warp, said wires being alternately of different thermoelectric properties, a group of flexible strips of insulating material woven as a woof back and forth across said wires, alternate strips respectively being above and below alternate individual wires to near their ends, the ends of said conductive wires projecting from the opposite ends of said group of strips, the pairs of the so projecting ends of said wires being positioned contiguous to one another and so held by the strips adjacent said ends being woven alternately first over and under and then under and over said pairs, the pairs at one end being reversed in order of thermoelectric properties, as compared with those at the other end, and junctions formed on said paired wires, thereby defining a thermoelectric generator consisting of thermocouples in cumulative series, so that upon maintaining a difference in temperature between projecting junctions at one end of the generator and those at the other end, a potential corresponding with the sum of the potentials developed in the thermocouples of the series will appear across the end wires at one end of the generator.

2. A thermoelectric generator as set forth in claim 1, wherein said junctions on said projecting ends of said wires are formed by fusing said ends together.

3. A thermoelectric generator comprising an array of conductive wires disposed side by side in spaced relation as a warp, said wires being alternately of different thermoelectric properties, an array of insulative flexible strips woven back and forth across said wires closely adjacent to one another as a woof to substantially close the spaces therebetween, the ends of said conductive wires projecting from opposite ends of said array of strips, the pairs of the so-projecting ends of said wires being positioned contiguous to one another and separated from neighboring pairs by the strips adjacent said ends being woven alternately first over and under and then under and over said pairs, the pairs at one end being reversed in order of thermoelectric properties as compared with those at the other end, and junctions formed on said paired wires, said strips extending between said junctions without interruption, individual wires at one end of said generator being separated but connected to the adjacent wires at the other end, thereby defining a series of thermocouples at the other end which may be heated to develop a potential between the individual wires at the first-mentioned end which is the sum of the potentials developed in the individual thermocouples at the junctions so produced.

4. A thermoelectric generator comprising an array of conductive wires disposed side by side in spaced relation as a warp, said wires being alternately of different thermoelectric properties, an array of insulative flexible strips woven back and forth across said wires closely adjacent to one another as a woof to substantially close the spaces therebetween, the ends of said conductive wires projecting from opposite ends of said array of strips, the pairs of the so projecting ends of said wires being positioned contiguous to one another and separated from neighboring pairs, the pairs at one end being reversed in order of thermoelectric properties as compared with those of the other end, and junctions formed on said paired wires, said strips extending between said junctions without interruption, individual wires at one end of said generator being separated but connected to the adjacent wires at the other end, thereby defining a series of thermocouples at the other end, the woven array of wires and strips being folded at right angles to the strips, a heat-insulating plate mounted on said folded array, a flat casing enclosing said array and plate and sealed thereabout, the terminal wires of the array being extended from one end of said casing while insulated therefrom, and means providing for heating the other end of said casing to generate an electrical potential in the wires which is the sum of the potentials developed in the individual thermocouples at the junctions so produced.

5. A thermoelectric generator as set forth in claim 3, wherein the wires are formed alternately of "Copel" and "Chromel," respectively, and the strips are formed of fiberglass.

6. The method of forming a thermoelectric generator comprising disposing a plurality of conductive wires side by side in spaced relation as a warp, wherein said wires are of alternately different thermoelectric properties, weaving a group of flexible strips as a woof of insulating material continuously back and forth across said wires, in which alternate strips are respectively above and below said wires, leaving only the ends of said wires projecting beyond the end strips, moving together the end portions of said wires to form pairs projecting beyond the strips at both ends, the pairs at one end being reversed in order of thermoelectric properties as compared with those at the other end, wherein some of the strips are woven over and under single wires and at the ends of such weaving other of said strips are woven over and under the pairs of said wires, with the pairs at one end of such single wire weaving being reversed in order of thermoelectric properties as compared with those at the other end of such weaving, in order to form cutting and junction-forming positions, and forming junctions at said pairs to thereby define a thermoelectric generator consisting of thermocouples in cumulative series, so that upon maintaining a difference in temperature between projecting junctions at one end of the generator and those at the other end, a potential corresponding with the sum of the potentials developed in the thermocouples of the wires will appear across the end wires at one end of the generator.

7. The method as set forth in claim 6, wherein the wires are cut at said junction-forming positions intermediate the ends of the group thereof and the junctions simultaneously formed at the cut ends of said wires.

8. The method as set forth in claim 6, including the cutting of the wires by a flame along a strip and across the paired wires, thereby simultaneously fusing and sealing the so-paired wires and forming junctions thereat.

9. The method as set forth in claim 6, wherein the conductive wires are alternately formed of "Copel" and "Chromel," respectively, and the strips are formed of fiberglass.

References Cited in the file of this patent

UNITED STATES PATENTS

| | | |
|---|---|---|
| 2,493,651 | Boelter et al. | Jan. 3, 1950 |
| 2,530,256 | Malek | Nov. 14, 1950 |

FOREIGN PATENTS

| | | |
|---|---|---|
| 573,703 | France | Mar. 15, 1924 |